(12) United States Patent
Yokota et al.

(10) Patent No.: US 7,856,256 B2
(45) Date of Patent: Dec. 21, 2010

(54) FOLDABLE PORTABLE TERMINAL DEVICE

(75) Inventors: Masanori Yokota, Kanagawa (JP);
Teruo Nanmoku, Kanagawa (JP); Akira Hasegawa, Tokyo (JP)

(73) Assignee: Panasonic Corporation, Osaka (JP)

( * ) Notice: Subject to any disclaimer, the term of this patent is extended or adjusted under 35 U.S.C. 154(b) by 774 days.

(21) Appl. No.: 11/719,794

(22) PCT Filed: Dec. 20, 2005

(86) PCT No.: PCT/JP2005/023335

§ 371 (c)(1),
(2), (4) Date: May 21, 2007

(87) PCT Pub. No.: WO2006/068122

PCT Pub. Date: Jun. 29, 2006

(65) Prior Publication Data

US 2009/0149225 A1    Jun. 11, 2009

(30) Foreign Application Priority Data

Dec. 20, 2004    (JP) ............................ 2004-367184

(51) Int. Cl.
*H04M 1/00* (2006.01)
*H04B 1/08* (2006.01)

(52) U.S. Cl. .............. 455/575.3; 455/575.1; 455/575.2; 455/350

(58) Field of Classification Search ............... 455/575.3
See application file for complete search history.

(56) References Cited

FOREIGN PATENT DOCUMENTS

| JP | 11-030226 | | 2/1999 |
|---|---|---|---|
| JP | 11-30226 A | | 2/1999 |
| JP | 1999-30226 A | * | 2/1999 |
| JP | 2000-244618 | | 9/2000 |
| JP | 2002-359666 | | 12/2002 |
| JP | 2003-060757 | | 2/2003 |
| JP | 2003-219005 | * | 7/2003 |
| JP | 2003-219005 A | | 7/2003 |
| JP | 2003-244293 | | 8/2003 |
| JP | 2004-029988 | | 1/2004 |
| JP | 2004-064302 | | 2/2004 |

(Continued)

OTHER PUBLICATIONS

International Search Report for application No. PCT/JP2005/023335 dated Mar. 20, 2006.

*Primary Examiner*—Lester Kincaid
*Assistant Examiner*—Yu (Andy) Gu
(74) *Attorney, Agent, or Firm*—RatnerPrestia (57) ABSTRACT

A foldable portable terminal device provided with a first housing includes a display unit, a speaker and a speaker sound hole, a second housing, and a hinge unit that couples the housings rotatably around two directions that perpendicularly intersect with each other. The device is configured such that coupling of the first housing and the hinge unit is coupled to a second rotary shaft of the hinge unit at a position closer to a surface having the speaker sound hole than a midpoint in a cross-section in a thickness direction of the first housing, and that a gap formed in a folded state in which the first housing is overlaid on the second housing with a surface having the speaker sound hole facing inside is greater than a gap formed in the folded state with the surface having the speaker sound hole facing outside.

2 Claims, 12 Drawing Sheets

| FOREIGN PATENT DOCUMENTS | JP | 2004-343267 A | 12/2004 |

JP 2004-153589 5/2004
JP 2004-343267 * 12/2004

* cited by examiner

FOLDABLE PORTABLE TERMINAL DEVICE

THIS APPLICATION IS A U.S. NATIONAL PHASE APPLICATION OF PCT INTERNATIONAL APPLICATION PCT/JP2005/023335.

TECHNICAL FIELD

The present invention relates to a foldable portable terminal device having a speaker, and in particular, to a portable terminal device allowing a clear output of sound from a speaker in a state in which one housing is overlaid on another housing.

BACKGROUND ART

Conventional foldable portable terminal devices that are typically used are reduced in size and weight by designs such as an internal component arrangement and a housing structure. Among such foldable portable terminal devices, a foldable portable telephone, for example, includes a first housing provided with a display unit, an receiver, an antenna, and so on, and a second housing provided with an operating unit having a main operational function, a microphone, and so on.

Figure 12A:
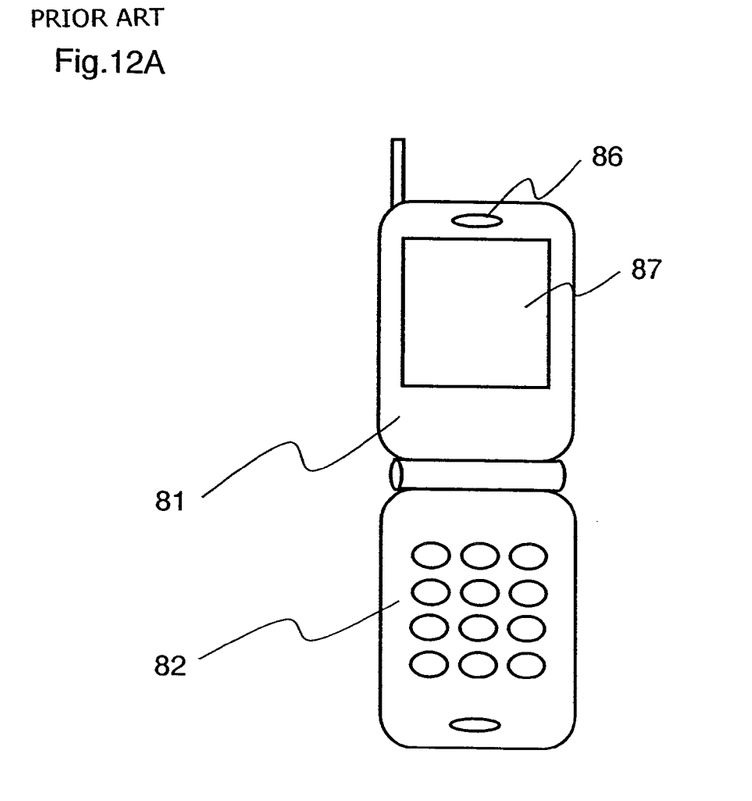
FIG. 12A is an external view showing a conventional foldable portable terminal device in the unfolded state.
Figure 12B:
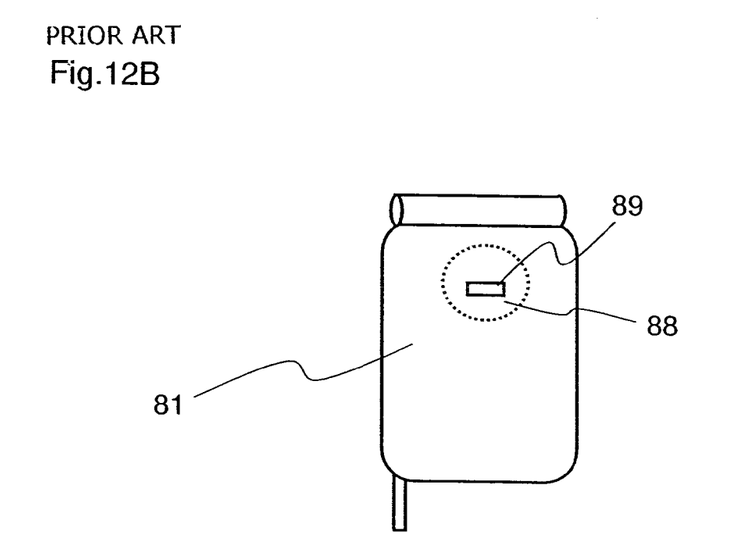
FIG. 12B is an external view showing the conventional foldable portable terminal device in the folded state.

As shown in FIG. 12A and FIG. 12B, a foldable portable terminal device is known which is configured such that speaker 88 for notifying a user of an incoming call or outputting warning sound and speaker sound hole 89 other than receiver 86 are provided on a surface of first housing 81 facing away from display unit 87, and that the user may easily catch sound outputted from speaker 88 with the housing being folded. In fact, such a configuration is useful, because a ringing tone is often outputted when the foldable portable terminal device is not used, that is, in a folded state.

Figure 13A:
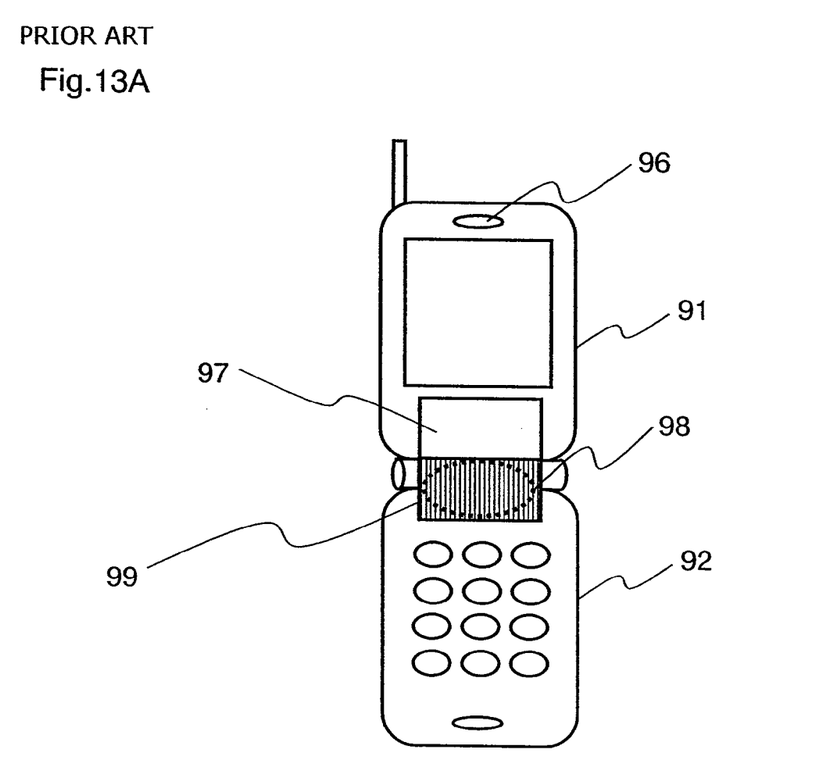
FIG. 13A is an external view showing a conventional foldable portable terminal device in the unfolded state.
Figure 13B:
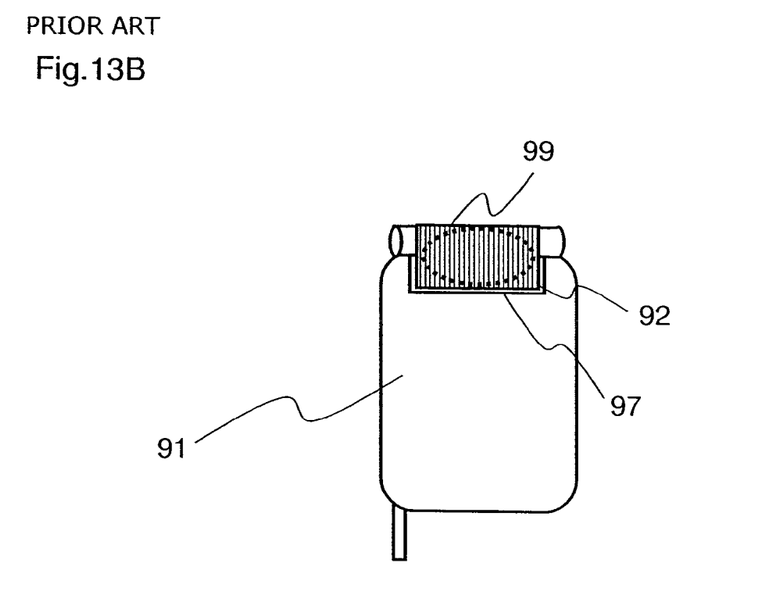
FIG. 13B is an external view showing the conventional foldable portable terminal device in the folded state.

Moreover, as shown in FIG. 13A and FIG. 13B, Japanese Patent Unexamined Publication No. 2003-60757, for example, discloses a portable telephone that is designed so that sound outputted from speaker 98 may be easily caught only with a single speaker with the housing being either closed or opened by providing speaker 98 for a surface having an operating unit on second housing 92, as well as opening 97 for first housing 91 so that speaker 98 and speaker sound hole 99 are exposed when first housing 91 is overlaid.

In the meantime, as a recent foldable portable terminal device, along with built-in functionalities of gaming, television, and camera, a rotatably foldable portable terminal device having a hinge unit of a dual axis structure that may be foldable with a display unit facing outside has been put into practical use. In this case, if the speaker sound hole is provided on a surface facing away from the display unit of the first housing as in the case of a conventional foldable portable telephone, there is a problem that the sound cannot be caught easily, because the speaker sound hole faces inside when the portable telephone is folded with the display unit facing outside.

Further, while utilizing the opening disclosed in the above Japanese Patent Unexamined Publication No. 2003-60757 may solve the above problem, however, this also increases design restrictions for components on an upper housing and a design, because it is necessary to provide an opening for the first housing, which requiring reduction of an area of the display unit and substrate in the first housing.

The present invention provides a solution for the above problem, by providing a foldable portable terminal device with which it is possible to secure a space for sound outputted from the speaker to be transmitted even when the speaker sound hole faces inside, thereby making the sound outputted from the speaker be easily caught and reducing the restrictions for other components.

DISCLOSURE OF THE INVENTION

In order to address the conventional problem, a foldable portable terminal device according to the present invention includes a first housing including at least a speaker and a speaker sound hole, a second housing, and a hinge unit that couples the first housing and the second housing rotatably. In a folded state in which the first housing is overlaid on the second housing, a surface of the first housing provided with the speaker sound hole is disposed to be inclined with respect to the second housing, and a gap is formed between the speaker sound hole of the first housing and the second housing.

With this configuration, the foldable portable terminal device having a single axis structure that is foldable or rotatable is configured to secure a space for sound outputted from the speaker to be transmitted even in the folded state in which the speaker sound hole faces inside, thereby making the sound outputted from the speaker be easily caught.

Further, the foldable portable terminal device according to the present invention includes a first housing including at least a speaker and a speaker sound hole, a second housing, and a hinge unit that couples the first housing and the second housing rotatably around at least two rotary shafts that perpendicularly intersect with each other. In a folded state in which the first housing is overlaid on the second housing with the speaker sound hole provided for the first housing facing inside, a surface provided with the speaker sound hole of the first housing is disposed to be inclined with respect to the second housing, and a gap is formed between the speaker sound hole of the first housing and the second housing.

With this configuration, the foldable portable terminal device having a dual axis structure that is rotatably foldable is configured to secure the space for sound outputted from the speaker to be transmitted even in the state in which the speaker sound hole faces inside, thereby making the sound outputted from the speaker be easily caught.

Further, the foldable portable terminal device according to the present invention, further includes a first housing including at least a speaker and a speaker sound hole, a second housing, and a hinge unit that couples the first housing and the second housing rotatably around at least two rotary shafts that perpendicularly intersect with each other. In a folded state in which the first housing is overlaid on the second housing with the speaker sound hole provided for the first housing facing inside, a gap is formed between the speaker sound hole of the first housing and the second housing by coupling the first housing and the hinge unit at a position at which a midpoint of the first housing in a cross-section in a thickness direction of the first housing is displaced from centers of the rotary shafts of the hinge unit.

With this configuration, the foldable portable terminal device having the dual axis structure that is rotatably foldable is configured so that the gap due to decentration of the hinge is formed between the first housing and the second housing.

Moreover, the foldable portable terminal device according to the present invention includes a first housing including at least a speaker and a speaker sound hole, a second housing, and a hinge unit that couples the first housing and the second housing rotatably. In a folded state in which the first housing is overlaid on the second housing, a recess is provided at the speaker sound hole of the first housing and in the vicinity of the speaker sound hole, the recess forming an opening when viewed from a longitudinal side of the first housing.

With this configuration, the foldable portable terminal device having the single axis structure that is foldable or rotatable is configured to include the recess to secure a space for sound outputted from the speaker to be transmitted even in the folded state in which the speaker sound hole faces inside, thereby making the sound outputted from the speaker be easily caught.

Further, the foldable portable terminal device according to the present invention includes a first housing including at least a speaker and a speaker sound hole, a second housing, and a hinge unit that couples the first housing and the second housing rotatably around at least two rotary shafts that perpendicularly intersect with each other. A recess is provided at the speaker sound hole of the first housing and in the vicinity of the speaker sound hole, the recess forming an opening when viewed from a longitudinal side of the first housing.

With this configuration, the foldable portable terminal device having the dual axis structure that is rotatably foldable is configured to, even in the folded state in which the speaker sound hole faces inside, include the recess to secure a space for sound outputted from the speaker to be transmitted even when the speaker sound hole is inside, thereby making the sound outputted from the speaker be easily caught.

Further, the foldable portable terminal device according to the present invention is a foldable portable terminal device that is rotatably foldable and having the dual axis structure that includes a projection disposed on a surface of the second housing facing toward the first housing; and a recess disposed at a position, at which the projection is brought into contact, on the surface provided with the speaker sound hole of the first housing.

With this configuration, the gap is made larger due to the projection in the folded state in which the surface provided with the speaker sound hole of the first housing faces inside, and the gap is made smaller in the folded state in which the speaker sound hole faces outside because of the recess provided on the surface that faces toward the projection, thereby making the foldable portable terminal device foldable in a reduced size.

According to the present invention, the foldable portable terminal device may secure a space for transmission of the sound outputted from the speaker even when the speaker sound hole faces inside, and thus the sound outputted from the speaker may be easily caught.

In particular, the foldable portable terminal device provided with the hinge unit of a dual axis structure having two rotary shafts that perpendicularly intersect with each other has a normal folded state without rotating the first housing, and a folded state in which the housings are folded after the first housing is opened and then rotated by 180 degrees.

According to the present invention, it is possible to clearly catch the sound outputted from the speaker in either state by configuring so that the gap between the housings is greater in the folded state with the speaker facing inside than in the folded state in which the surface provided with the speaker sound hole faces outside. Therefore, according to this configuration, it is possible to reduce the thickness of a main body of the housing, thereby allowing the terminal device to be carried in a compact state in the folded state in which a display unit of the first housing faces inside.

Further, the sound outputted from the speaker can be easily caught regardless of the state of the housing, because it is possible to secure the space for sound outputted from the speaker to be transmitted even in the state in which the speaker sound hole faces inside. In addition, because it is not necessary to install any more speakers or speaker sound holes, a foldable portable terminal device that guarantees flexibility in design may be provided.

DESCRIPTION OF REFERENCE NUMERALS 1 first housing
2 second housing
3 coupling unit
4 first rotary shaft
5 second rotary shaft
6 receiver sound hole
7 display unit
8 speaker
9 speaker sound hole
10 operating unit
11 hinge unit
41 recess
61 projection
62 recess

DESCRIPTION OF THE PREFERRED EMBODIMENTS

In the following, preferred embodiments for carrying out the invention will be described with reference to the drawings. Note that, for a foldable portable terminal device, such as an receiver, a telephone microphone, antenna, a control unit, and a transmitting and receiving unit are provided on a surface of a housing and at predetermined positions of the housing. However, these components are not shown in the drawings for the sake of simplicity.

First Embodiment

Figure 1A:
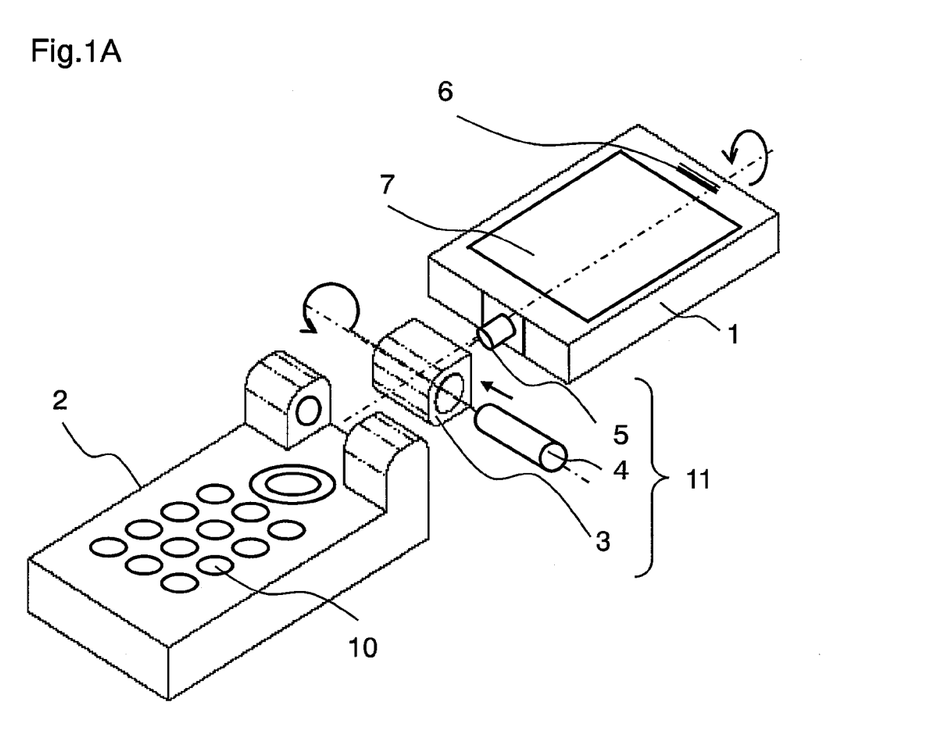
FIG. 1A is an exploded perspective view of a rotatably foldable portable terminal device according to a first embodiment of the present invention.
Figure 1B:
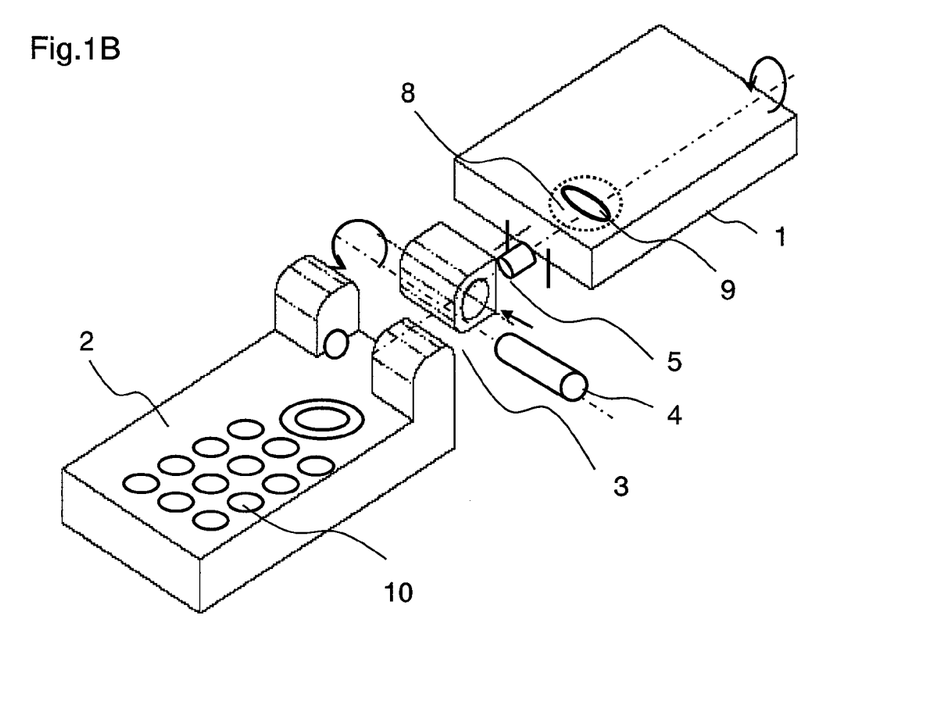
FIG. 1B is an exploded perspective view of the rotatably foldable portable terminal device according to the first embodiment of the present invention.

An invention according to a first embodiment of the present invention is now described. FIG. 1A and FIG. 1B show exploded perspective views of a housing structure of a rotatably foldable portable terminal device according to the first embodiment of the present invention.

In FIG. 1A and FIG. 1B, first housing 1 and second housing 2 are foldably and rotatably coupled via coupling unit 3. Hinge unit 11 includes coupling unit 3 that couples first housing 1 and second housing 2, and two shafts of first rotary shaft 4 that performs a folding/unfolding action and second rotary shaft 5 that performs rotary action in a direction perpendicular to a folding/unfolding direction. First housing 1 may perform the folding/unfolding action and the rotary action. FIG. 1A shows an unfolded state in which first housing 1 and second housing 2 are opened by the folding/unfolding action of a first rotary shaft 4. FIG. 1B shows a state in which, after being opened by the folding/unfolding action of first rotary shaft 4, first housing 1 is rotated by 180 degrees by the rotary action about second rotary shaft 5. As shown in FIG. 1A, first housing 1 is provided with receiver sound hole 6 through which voice of a caller can be heard during a call and display unit 7 on a surface on which receiver sound hole 6 is provided. Further, on first housing 1, speaker 8 for outputting such as a ringing tone and warning sound is provided on a rear surface against the surface having receiver sound hole 6 in addition to a speaker as the receiver, and speaker sound hole 9 is formed on the rear surface. Second housing 2 is provided with operating unit 10 on a surface facing first housing 1.

Figure 2A:
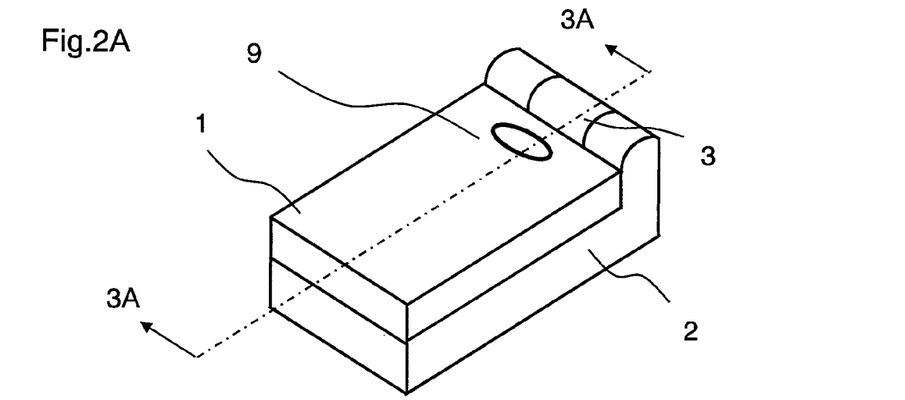
FIG. 2A is an external view showing the rotatably foldable portable terminal device according to the first embodiment of the present invention in a folded state.
Figure 2B:
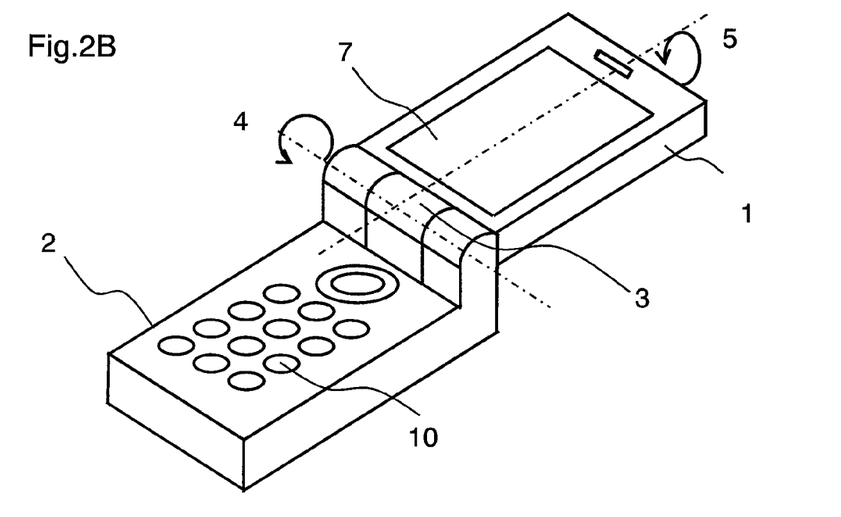
FIG. 2B is an external view showing the rotatably foldable portable terminal device according to the first embodiment of the present invention in an unfolded state.
Figure 2C:
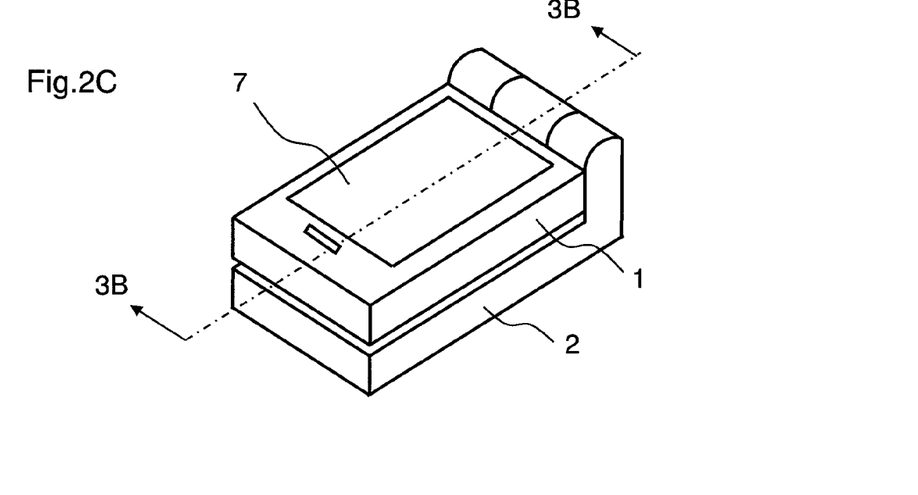
FIG. 2C is an external view showing the rotatably foldable portable terminal device according to the first embodiment of the present invention in a state in which a first housing is overlaid on a second housing with a speaker sound hole facing inside.

FIG. 2A, FIG. 2B, and FIG. 2C show external views of a rotatably foldable portable terminal device according to the first embodiment of the present invention. FIG. 2A shows a closed state in which the portable terminal device is folded with speaker sound hole 9 of first housing 1 facing outside, FIG. 2B shows an unfolded state in which first housing 1 is opened in the folding/unfolding direction, and FIG. 2C shows a folded state in which the portable terminal device is folded such that first housing 1 is rotated around second rotary shaft 5 by 180 degrees in the unfolded state and then first housing 1 is overlaid on second housing 2 with speaker sound hole 9 facing inside.

Figure 3A:
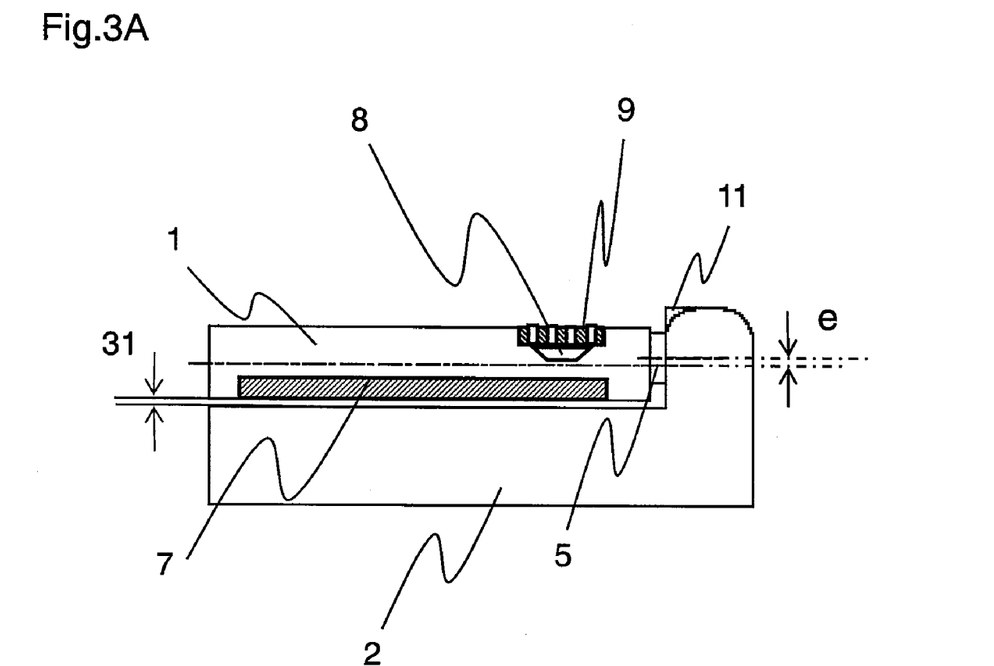
FIG. 3A is a sectional view showing the rotatably foldable portable terminal device according to the first embodiment of the present invention in the folded sate with the speaker sound hole facing outside.
Figure 3B:
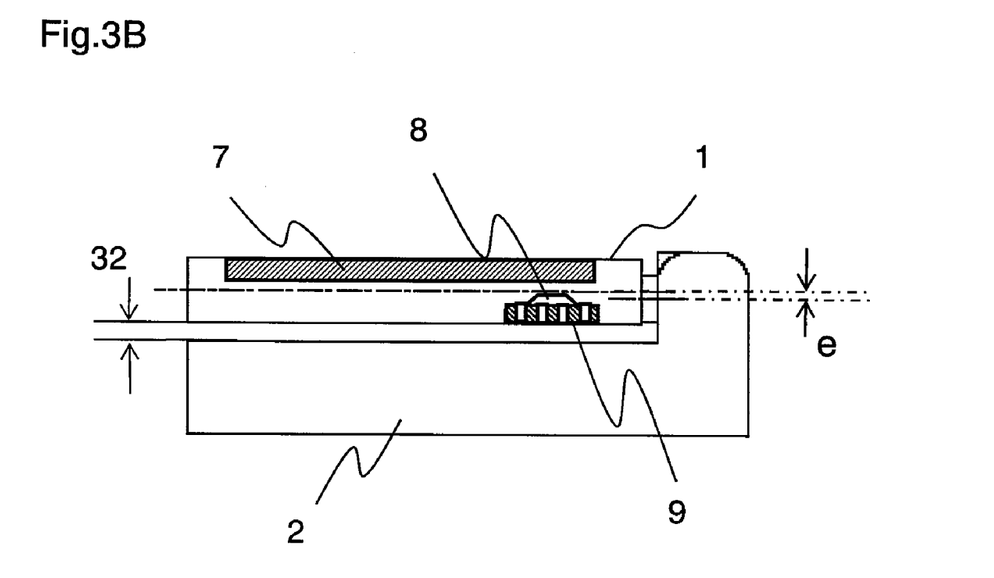
FIG. 3B is a sectional view showing the rotatably foldable portable terminal device according to the first embodiment of the present invention in the folded sate with the speaker sound hole facing inside.

FIG. 3A and FIG. 3B show sectional views of the rotatably foldable portable terminal device according to the first embodiment of the present invention. FIG. 3A shows the sectional view of the folded state, taken at line 3A-3A in FIG. 2A, in which speaker sound hole 9 of first housing 1 faces outside, and FIG. 3B shows the sectional view of the folded state, taken at line 3B-3B in FIG. 2C, in which first housing 1 is rotated about second rotary shaft 5 by 180 degrees in the unfolded state, and then first housing 1 is overlaid on second housing 2 with display unit 7 exposed outside.

As shown in FIG. 3A, second rotary shaft 5 is coupled to first housing 1 at a position displaced from a midpoint of first housing 1 in thickness direction by a distance e. Second rotary shaft 5 is coupled to first housing 1 at the position closer to a surface having speaker sound hole 9 than the midpoint of first housing 1 in thickness direction. According to this configuration, as shown in FIG. 3A and FIG. 3B, gap 32 between the housings in the folded state with the speaker sound hole inside is greater than gap 31 between the housings in the folded state with speaker sound hole 9 facing outside. Therefore, in the normally folded state in which display unit 7 faces inside, gap 31 with the second housing becomes very small and a thickness of an entire housing may be reduced. At this state, no problem arises regarding sound output from the speaker, because speaker sound hole 9 is positioned outside. On the other hand, in the folded state in which display unit 7 faces outside, gap 32 with second housing 2 becomes larger compared to the case in which speaker sound hole 9 face outside. As a result, outputted sound from speaker may be transmitted through the gap as clear voice and sound.

Further, FIG. 3B shows a sate in which first housing 1 and second housing 2 are disposed in parallel. However, also in a configuration in which a tip of first housing 1 is in contact with a plane of second housing 2, a gap is formed between speaker sound hole 9 near hinge unit 11 and second housing 2, by making the surface of first housing 1 provided with speaker sound hole 9 to be slanted to second housing 2. Therefore, the outputted sound from speaker 8 may be transmitted through the gap as clear voice and sound.

Further, according to this configuration, it is possible to listen to voice and sound with a favorable sound pressure even in a case in which the foldable portable terminal device is used mainly in the folded state with display unit 7 exposed outside, such as the cases in which a television receiving function is provided for the foldable portable terminal device to be used as a television receiver, a camera is provided for the foldable portable terminal device to be used as a still camera or a movie camera, and a navigation system is provided for the foldable portable terminal device to be used as a navigator.

It should be noted that, while the present embodiment is configured so that gap 32 is greater than gap 31 by coupling second rotary shaft 5 to first housing at the position displaced from the midpoint in the thickness direction, the present invention is not limited to this, and may be implemented by a configuration in which the coupling is conducted by coupling unit 3 and second rotary shaft 5 at a position displaced from a center of the shaft 5.

Second Embodiment

Figure 4A:
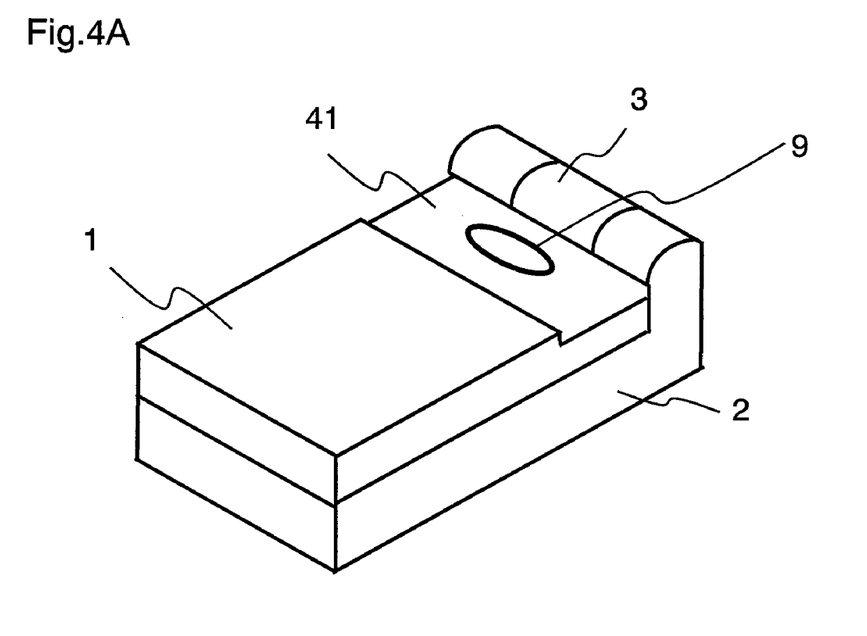
FIG. 4A is an external view showing a rotatably foldable portable terminal device according to a second embodiment of the present invention in the folded sate with the speaker sound hole facing outside.
Figure 4B:
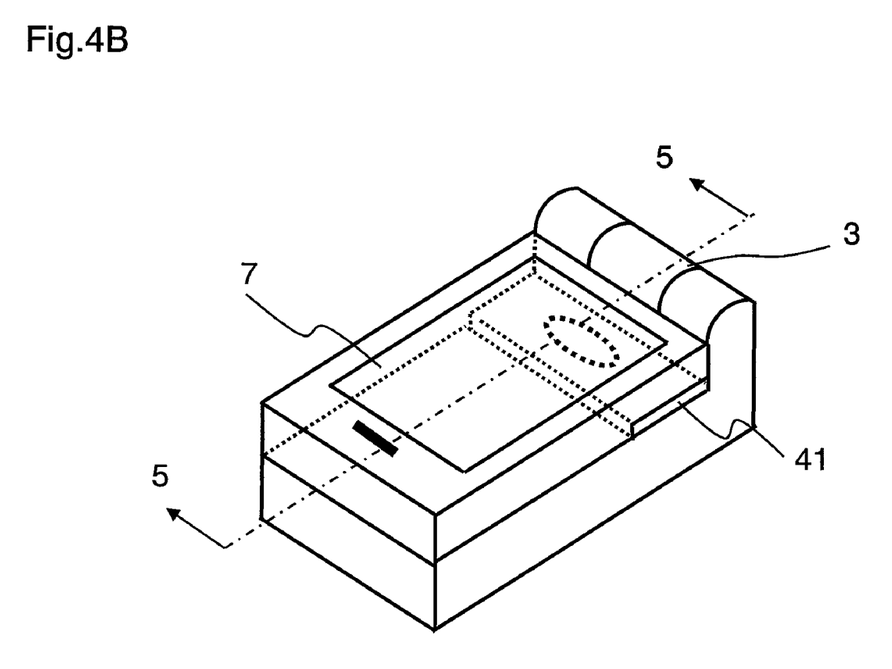
FIG. 4B is an external view showing the rotatably foldable portable terminal device according to the second embodiment of the present invention in the folded sate with the speaker sound hole facing inside.
Figure 5:
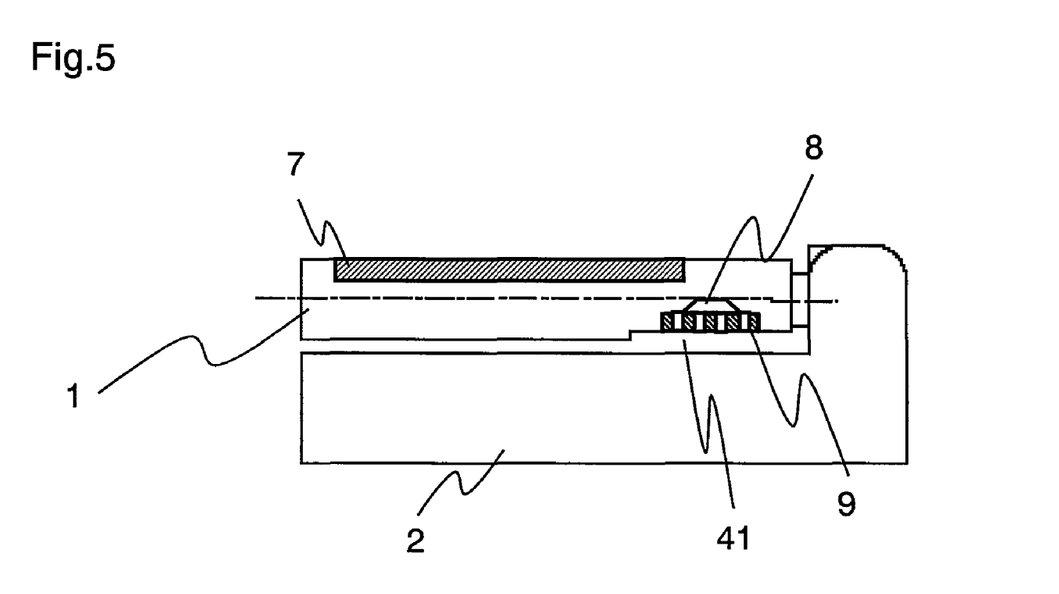
FIG. 5 is a sectional view showing the rotatably foldable portable terminal device according to the second embodiment of the present invention in the folded sate with the speaker sound hole facing inside.

An invention according to a second embodiment of the present invention is described. FIG. 4A and FIG. 4B show external views of a rotatably foldable portable terminal device according to the second embodiment of the present invention. Further, FIG. 5 shows a sectional view of the rotatably foldable portable terminal device according to the second embodiment of the present invention. In FIG. 4A, FIG. 4B, and FIG. 5, the same components as in FIG. 1 are indicated by the same reference numerals and explanation for such components are omitted.

FIG. 4A shows the closed state in which display unit 7 of first housing 1 faces inside, and FIG. 4B shows the folded state in which first housing 1 is rotated by 180 degrees in a rotary direction from the unfolded state, and then first housing 1 is overlaid on second housing 2 with display unit 7 exposed outside. FIG. 5 shows a sectional view, taken at line 5-5 in FIG. 4B, of the folded state in which first housing 1 is rotated by 180 degrees in the rotary direction from the unfolded state and then first housing 1 is overlaid on second housing 2 with display unit 7 exposed outside.

In FIG. 4A, first housing 1 is provided with speaker sound hole 9, and has recess 41 formed along width direction of first housing 1 at a position corresponding to speaker sound hole 9. With this configuration, in the folded state in which a surface having speaker sound hole 9 faces inside as shown in FIG. 4B and FIG. 5, recess 41 forms a gap, and the sound outputted form the speaker may be transmitted outside clearly through the gap.

It should be noted that, while, in the present embodiment, speaker sound hole 9 and recess 41 are provided in the vicinity of coupling unit 3 of the first housing along width direction of the first housing, the present invention is not limited to this configuration, and the speaker sound hole and the recess may be provided on the first housing on a portion away from the coupling unit. Further, the speaker sound hole and the recess may have any shape and size as long as the sound outputted from the speaker sound hole may be transmitted outside through the gap.

Third Embodiment

Figure 6A:
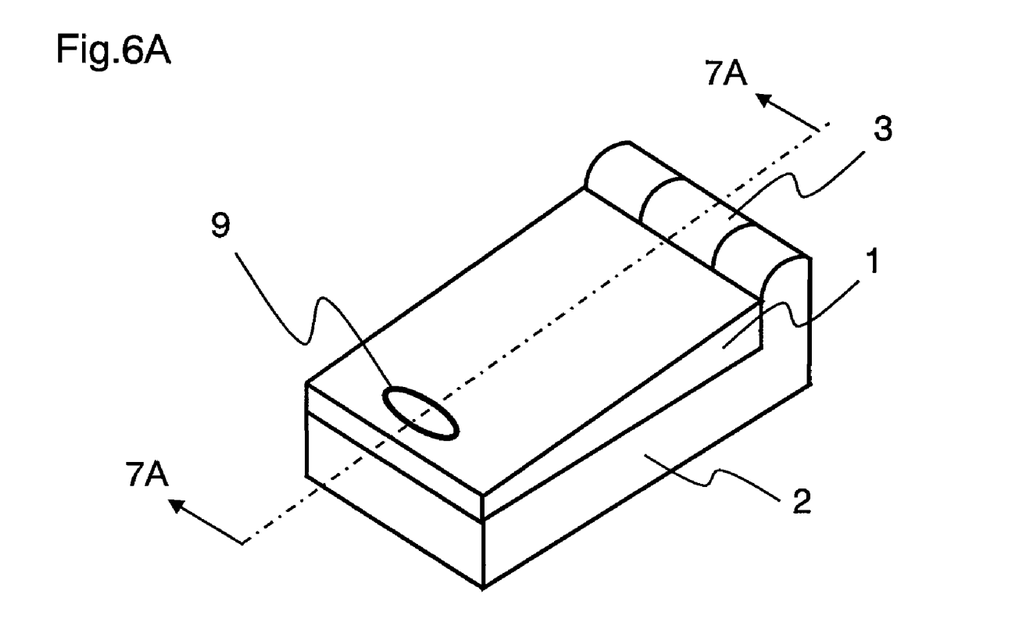
FIG. 6A is an external view showing a rotatably foldable portable terminal device according to a third embodiment of the present invention in the folded sate with the speaker sound hole facing outside.
Figure 6B:
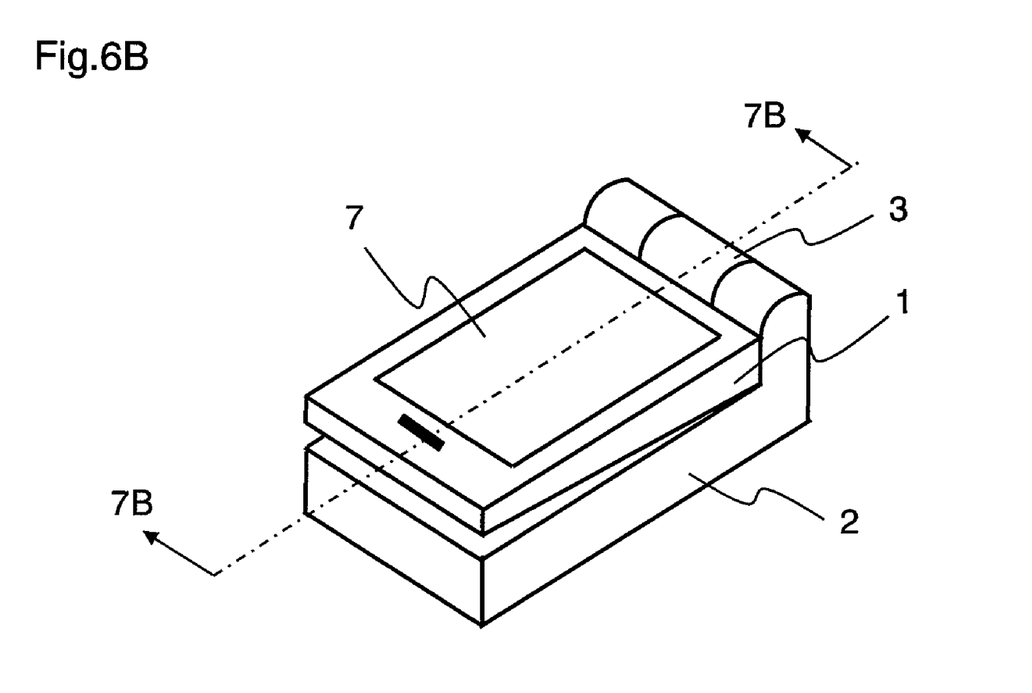
FIG. 6B is an external view showing the rotatably foldable portable terminal device according to the third embodiment of the present invention in the folded sate with the speaker sound hole facing inside.
Figure 7A:
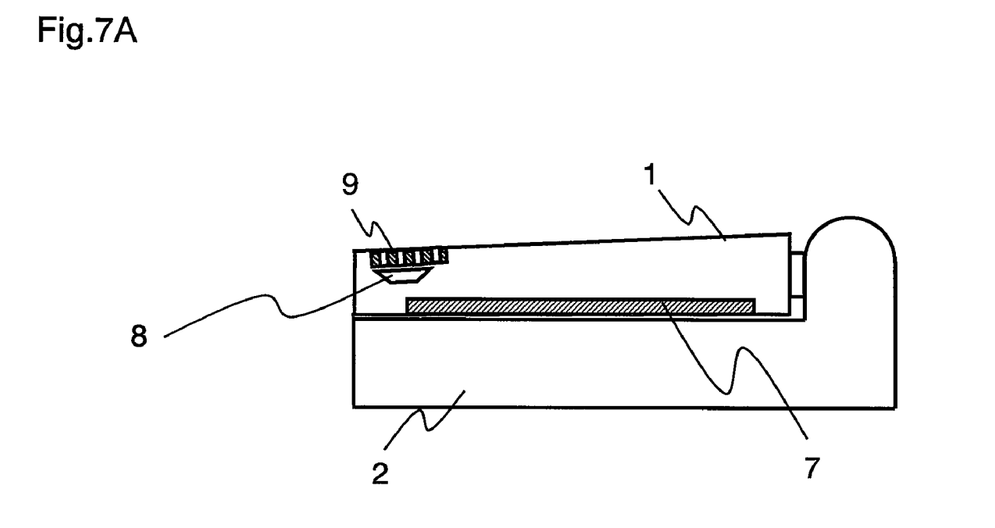
FIG. 7A is a sectional view showing the rotatably foldable portable terminal device according to the third embodiment of the present invention in the folded sate with the speaker sound hole facing outside.
Figure 7B:
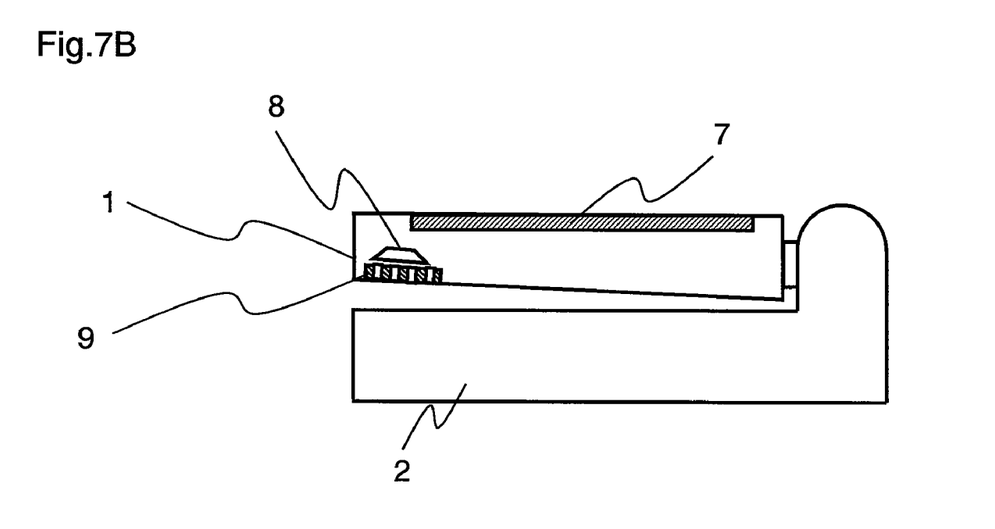
FIG. 7B is a sectional view showing the rotatably foldable portable terminal device according to the third embodiment of the present invention in the folded sate with the speaker sound hole facing inside.

FIG. 6A and FIG. 6B show external views of a rotatably foldable portable terminal device according to a third embodiment of the present invention. Further, FIG. 7A and FIG. 7B show sectional views of the rotatably foldable portable terminal device according to the third embodiment of the present invention. In FIG. 6A, FIG. 6B, FIG. 7A, and FIG. 7B, the same components as in FIG. 1 are indicated by the same reference numerals and explanation for such components are omitted here.

FIG. 6A shows the unfolded state in which display unit 7 of first housing 1 faces inside, and FIG. 6B shows the folded state in which first housing 1 is rotated by 180 degrees in a rotary direction from the open state, and then first housing 1 is overlaid on second housing 2 with display unit 7 exposed outside. FIG. 7A shows a sectional view, taken at line 7A-7A in FIG. 6A, of the closed state in which display unit 7 of first housing 1 faces inside, and FIG. 7B shows a sectional view, taken at line 7B-7B in FIG. 6B, of the folded state in which first housing 1 is rotated by 180 degrees in the rotary direction from the unfolded state and then first housing 1 is overlaid on second housing 2 with display unit 7 exposed outside.

As shown in FIG. 6A and FIG. 6B, it is configured such that the surface having speaker sound hole 9 of first housing 1 is inclined so that a thickness of first housing 1 at a portion having speaker sound hole 9 is thinner than other portions of first housing 1. As shown in FIG. 7B, in the folded state in which speaker sound hole 9 faces inside, a gap due to the inclination is formed between first housing 1 and second housing 2.

With this configuration, in the folded state in which the surface having speaker sound hole 9 faces inside, the sound outputted form the speaker may be transmitted outside clearly through the gap. Further, in the state in which the surface having speaker sound hole 9 faces outside, it is possible to reduce the thickness of the housing by a configuration to make the gap between the housings smaller or to be foldable without gap.

Fourth Embodiment

Figure 8A:
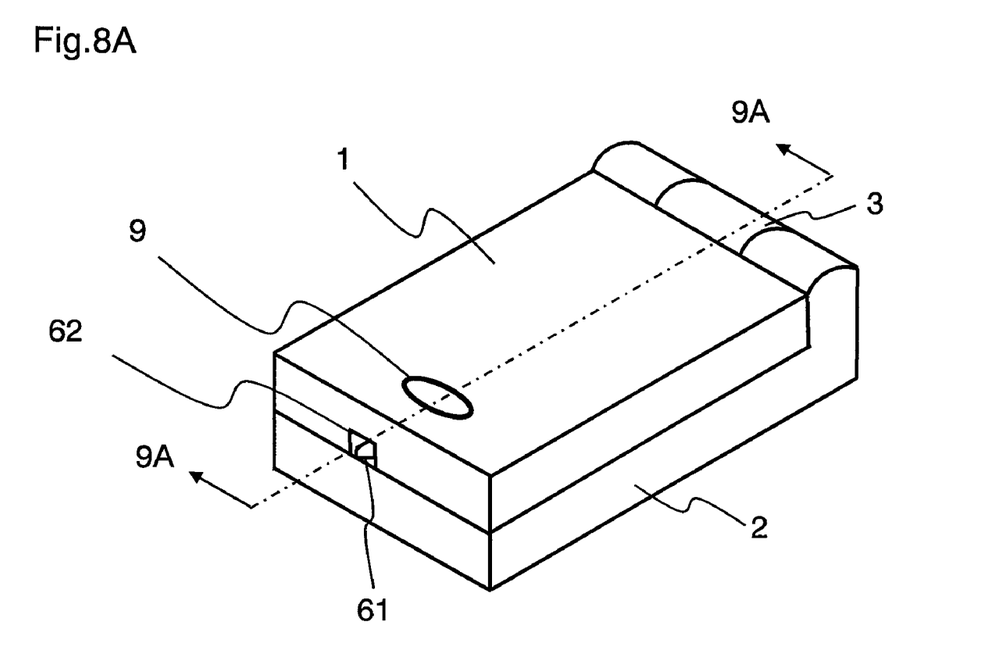
FIG. 8A is an external view showing a rotatably foldable portable terminal device according to a fourth embodiment of the present invention in the folded sate with the speaker sound hole facing outside.
Figure 8B:
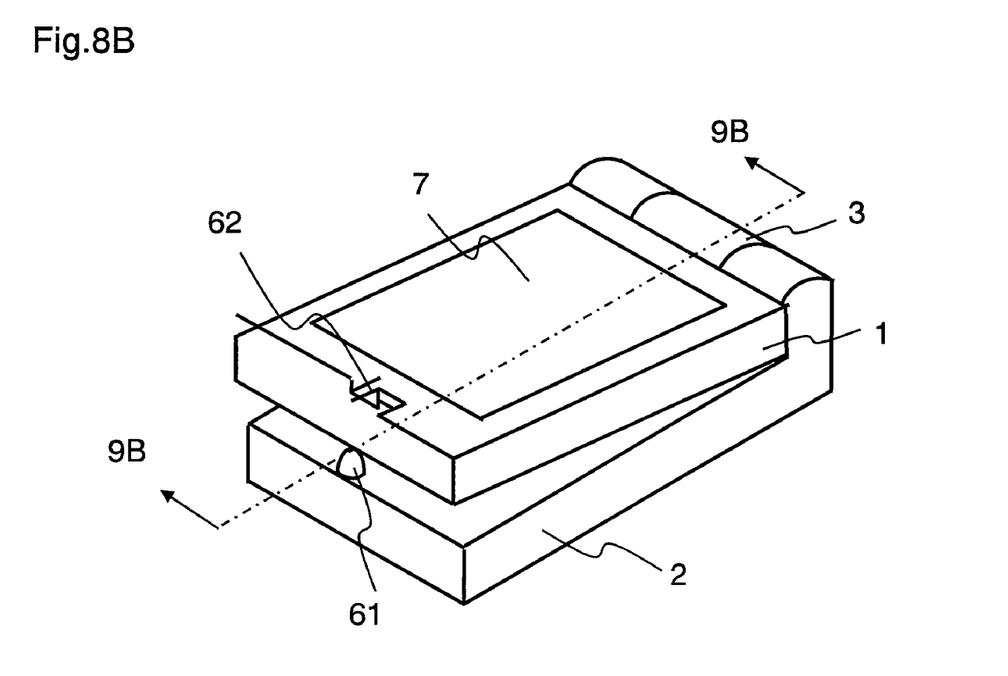
FIG. 8B is an external view showing the rotatably foldable portable terminal device according to the fourth embodiment of the present invention in the folded sate with the speaker sound hole facing inside.
Figure 9A:
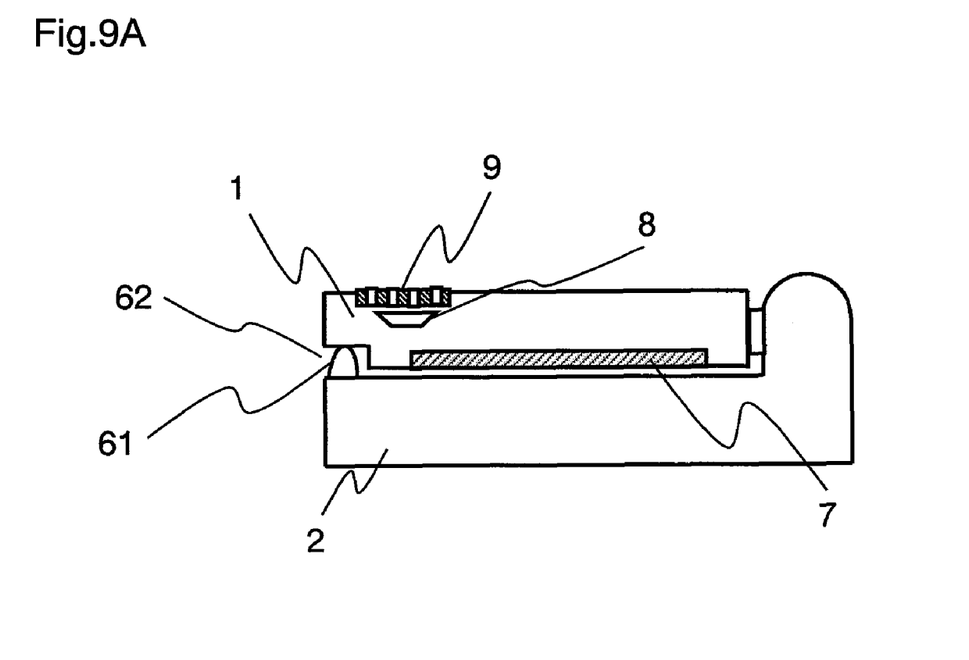
FIG. 9A is a sectional view showing the rotatably foldable portable terminal device according to the fourth embodiment of the present invention in the folded sate with the speaker sound hole facing outside.
Figure 9B:
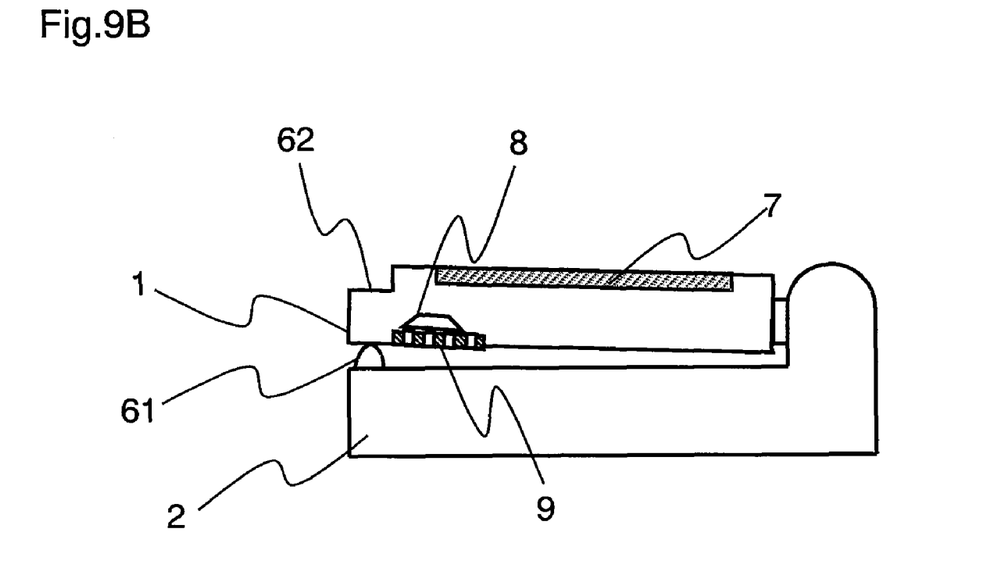
FIG. 9B is a sectional view showing the rotatably foldable portable terminal device according to the fourth embodiment of the present invention in the folded sate with the speaker sound hole facing inside.

An invention according to a fourth embodiment of the present invention is now described. FIG. 8A and FIG. 8B show external views of a rotatably foldable portable terminal device according to the fourth embodiment of the present invention. Further, FIG. 9A and FIG. 9B shows sectional view of the rotatably foldable portable terminal device according to the fourth embodiment of the present invention. In FIG. 8A, FIG. 8B, FIG. 9A, and FIG. 9B, the same components as in FIG. 1 are indicated by the same reference numerals and explanation for such components are omitted.

FIG. 8A shows the folded state in which display unit 7 of first housing 1 faces inside, and FIG. 8B shows the folded state in which first housing 1 is rotated by 180 degrees in a rotary direction from the unfold state, and then first housing 1 is overlaid on second housing 2 with display unit 7 exposed outside. FIG. 9A shows a sectional view, taken at line 9A-9A in FIG. 8A, of the folded state in which display unit 7 of first housing 1 faces inside, and FIG. 9B shows a sectional view, taken at line 9B-9B in FIG. 8B, of the folded state in which first housing 1 is rotated by 180 degrees in the rotary direction from the unfolded state and then first housing 1 is overlaid on second housing 2 with display unit 7 exposed outside.

As shown in FIG. 8A and FIG. 8B, projection 61 is provided on a surface having an operating unit of second housing 2, and recess 62 is provided at a portion, where projection 61 is brought into contact, on a surface opposite to the surface having speaker sound hole 9 of first housing 1. As shown in FIG. 9A, in the folded state in which the surface having speaker sound hole 9 faces outside, a gap between first housing 1 and second housing 2 is made smaller because projection 61 and recess 62 are brought into contact. On the other hand, as shown in FIG. 9B, in the folded state in which speaker sound hole 9 faces inside, a gap due to projection 61 is formed between first housing 1 and second housing 2.

With this configuration, in the folded state in which the surface having speaker sound hole 9 faces inside, the sound outputted form the speaker may be transmitted outside clearly through the gap. Further, in the state in which the surface having speaker sound hole 9 faces outside, it is possible to reduce the thickness of the housing because the gap between the housings is made smaller or the housings are foldable without gap according to the sizes of projection 61 and recess 62.

It should be noted that the positions to provide projection 61 and recess 62 are not limited to the embodiment of the present invention, and projection 61 and recess 62 may be provided at different positions.

Fifth Embodiment

In the above first to fourth embodiment, the rotatably foldable portable terminal device provided with a hinge having the rotatably foldable dual axis structure is described. However, the present invention may be configured as a foldable portable terminal device that only performs the folding/unfolding action, in which the speaker sound hole is provided on a surface facing toward the second housing, and the sound outputted from the speaker sound hole may be clearly transmitted outside through the gap. In the following, an invention according to a fifth embodiment of the present invention is described.

Figure 10:
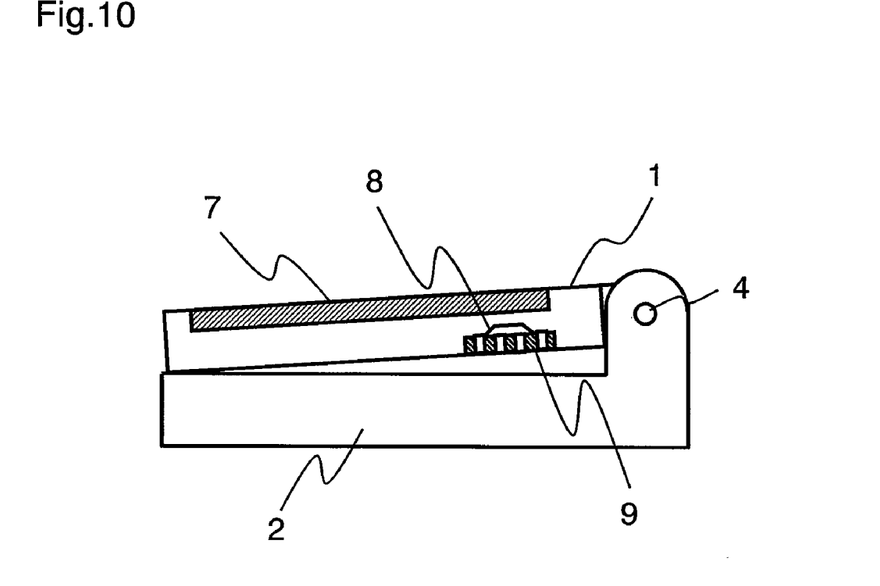
FIG. 10 is a sectional view showing a foldable portable terminal device according to a fifth embodiment of the present invention in the folded sate.

FIG. 10 shows a sectional view showing the foldable portable terminal device according to the fifth embodiment of the present invention in the folded state. First housing 1 is supported by first rotary shaft 4 foldably to second housing 2. The foldable portable terminal device according to FIG. 10 only performs the folding/unfolding action of first housing 1 about first rotary shaft 4. The surface of first housing 1 facing toward second housing 2 is provided with speaker 8 and speaker sound hole 9. The surface of first housing 1 facing toward second housing 2 is inclined with respect to second housing 2 so that a gap is formed between a surface where speaker 8 and speaker sound hole 9 are provided and housing 2. When there is an incoming call and speaker 8 emits sound while first housing 1 is in the folded state, the sound is outputted through the gap in the vicinity of speaker sound hole 9 between first housing 1 and second housing 2, and therefore, the sound outputted form the speaker may be clearly transmitted outside.

Sixth Embodiment

Furthermore, the present invention may be configured as a foldable portable terminal device of a rotary sliding type that only performs the rotary action, in which the speaker sound hole is provided on a surface of the first housing opposite to a surface where the display unit is provided so that the sound outputted from the speaker sound hole may be clearly transmitted outside through the gap even in the overlaid state. In the following an invention according to a sixth embodiment of the present invention is described.

Figure 11:
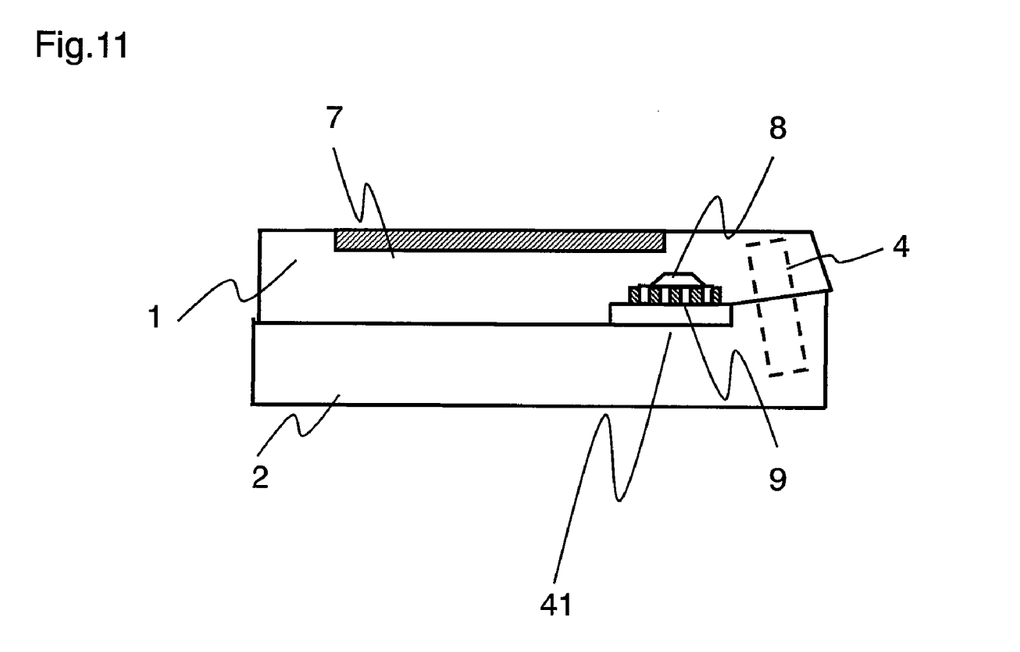
FIG. 11 is a sectional view showing a foldable portable terminal device according to a sixth embodiment of the present invention in the folded sate.

FIG. 11 shows a sectional view showing the foldable portable terminal device according to the sixth embodiment of the present invention in the folded state. First housing 1 is rotatable in a horizontal direction around first rotary shaft 4 supported in an inclined manner with respect to second housing 2. The foldable portable terminal device according to FIG. 11 may be used as the so-called rotary sliding type by extending to a length of the device to a length suitable for making a telephone call by rotating the first housing, or may be used by rotating the first housing to overlay on the second housing. As shown in FIG. 11, a recess 41 is provided on the surface of first housing 1 facing toward second housing 2, and recess 41 is provided with speaker 8 and speaker sound hole 9. Recess 41 allows sound output through the gap even with first housing 1 overlaid on second housing 2, and therefore, the sound outputted form the speaker may be clearly transmitted outside.

INDUSTRIAL APPLICABILITY

The foldable portable terminal device according to the present invention is configured so that the sound can be clearly caught even when the speaker sound hole is facing inside, and it is not necessary to install any more speakers or speaker sound holes. Accordingly, the foldable portable terminal device according to the present invention is useful, as a foldable portable terminal device and the like, in that it reduces the thickness in the normal folded state as well as guarantees flexibility in designing.

The invention claimed is:

1. A foldable portable terminal device comprising:
a first housing including at least a speaker and a speaker sound hole;
a second housing; and
a hinge unit that couples the first housing and the second housing rotatably, the hinge unit including a coupling unit that couples the first housing and the second housing, a first rotary shaft that rotates the first housing and the second housing in a folding/unfolding direction, and a second rotary shaft that perpendicularly intersects with the first rotary shaft, wherein
in a folded state in which the first housing is overlaid on the second housing with the speaker sound hole provided for the first housing facing inside, a gap is formed between the speaker sound hole of the first housing and the second housing by coupling the first housing and the hinge unit at a position at which a midpoint of the first housing in a thickness direction is displaced from a center of the second rotary shaft of the hinge unit, and
by coupling the first rotary shaft of the hinge unit and the first housing at a position closer to a surface provided with the speaker sound hole than a midpoint of the first housing in a thickness direction of the first housing, the gap between the speaker sound hole of the first housing and the second housing formed in the folded state in which the first housing is overlaid on the second housing with the speaker sound hole provided for the first housing facing inside becomes greater than the gap between the speaker sound hole of the first housing and second housing formed in the folded state in which the first housing is overlaid on the second housing with the speaker sound hole provided for the first housing facing outside.

2. A foldable portable terminal device, comprising:
a first housing including at least a speaker and a speaker sound hole;
a second housing;
a hinge unit that couples the first housing and the second housing rotatably around at least two rotary shafts that perpendicularly intersect with each other;
a projection disposed on a surface of the second housing facing toward the first housing; and a recess disposed at a position, at which the projection is brought into contact, on a rear surface against the surface provided with the speaker sound hole of the first housing, wherein in a folded state in which the first housing is overlaid on the second housing with the speaker sound hole provided for the first housing facing inside, a surface provided with the speaker sound hole of the first housing is provided to be inclined with respect to the second housing, and a gap is formed between the speaker sound hole of the first housing and the second housing.

\* \* \* \* \*